United States Patent
Vinegar et al.

[11] Patent Number: 6,102,622
[45] Date of Patent: Aug. 15, 2000

[54] REMEDIATION METHOD

[75] Inventors: Harold J. Vinegar; Eric de Rouffignac, both of Houston, Tex.

[73] Assignee: Board of Regents of the University of Texas System, Austin, Tex.

[21] Appl. No.: 09/076,557

[22] Filed: May 12, 1998

Related U.S. Application Data

[63] Continuation of application No. PCT/EP98/02801, May 6, 1998.
[60] Provisional application No. 60/045,896, May 7, 1997.

[51] Int. Cl.⁷ .................................................. B09B 3/00
[52] U.S. Cl. ...................................... 405/128; 166/272.7
[58] Field of Search .................................. 405/128, 131; 166/272.7, 50

[56] References Cited

U.S. PATENT DOCUMENTS

| | | | |
|---|---|---|---|
| 2,902,270 | 9/1959 | Salomonsson et al. | 262/3 |
| 3,181,613 | 5/1965 | Krueger | 166/38 |
| 4,973,811 | 11/1990 | Bass | 219/10.57 |
| 5,060,287 | 10/1991 | Van Egmond | 392/301 |
| 5,076,727 | 12/1991 | Johnson et al. | 405/128 |
| 5,152,341 | 10/1992 | Kasevich | 166/248 |
| 5,190,405 | 3/1993 | Vinegar et al. | 405/128 |
| 5,193,934 | 3/1993 | Johnson et al. | 405/128 |
| 5,221,827 | 6/1993 | Marsden, Jr. et al. | 219/200 |
| 5,255,742 | 10/1993 | Mikus | 166/303 |
| 5,271,693 | 12/1993 | Johnson et al. | 405/128 |
| 5,449,251 | 9/1995 | Daily et al. | 405/128 |
| 5,547,311 | 8/1996 | Kenda | 405/52 |

OTHER PUBLICATIONS

International Search Report dated Sep. 25, 1998.

*Primary Examiner*—William Neuder
*Assistant Examiner*—Zakaya Walker
*Attorney, Agent, or Firm*—Conley, Rose & Tayon, PC

[57] ABSTRACT

A method is provided to remove contaminants that are more dense than water from a contaminated volume of earth, the contaminants pooled above a layer of earth, the method comprising the steps of: providing an essentially horizontal wellbore along the interface between the layer of earth and the contaminants; heating at least a portion of the contaminants in situ from the wellbore; and removing the heated contaminants by heating through the horizontal wellbore. The wellbores preferably include both heaters and provide a conduit for removal of contaminants, and preferably also provide heaters located within the wellbores in addition to those heaters required to vaporize the contaminants to maintain the contaminants in a vapor state until the vapors reach a well head and can be further processed at the surface.

11 Claims, 2 Drawing Sheets

REMEDIATION METHOD

This is a continuation of PCT/EP98/02801, filed May 6, 1998, which claims benefit of U.S. Provisional Application Ser. No. 60/045,896, filed May 7, 1997.

FIELD OF THE INVENTION

The invention relates to an in situ thermal desorption process for remediation of denser than water contaminants trapped on impermeable earth layers.

BACKGROUND TO THE INVENTION

Thermal desorption methods to remove volatile contaminants from soils in situ are suggested in, for example, U.S. Pat. Nos. 4,973,811, 5,076,727, 5,152,341, 5,190,405, 5,193,934, 5,221,827, and 5,271,693. Methods of applying heat include microwave and radio frequency electrical power along with resistance heating between electrodes; injection of hot gases; and conduction of electricity through the soil. Conductive heat transfer from heat injection wells are suggested in, for example, U.S. Pat. Nos. 5,190,405 and 5,271,693. U.S. Pat. No. 5,271,693 suggests a heat injection well through which vapors are extracted from the formation.

These methods generally rely on maintenance of a low pressure at the surface or at a vapor extraction wellbore to control movement of contaminants from their initial position to a point where they can be recovered. When the contaminants are substantially immiscible with water and are more dense than water, the contaminants tend to sink downward and collect on clay or other impermeable layers. These contaminants are referred to as DNAPLs (dense nonaqueous phase liquids). These layers of clay often lay along old river beds that have been covered by sediment. These clay surfaces are generally covered with depressions (like a muffin tin) which act as traps for the DNAPL. Pools of DNAPL therefore are often thin and scattered along low spots on the layer of clay.

The most common remediation method for such contaminates is to put a well where it is thought that depressions lie in the clay surface, and to pump liquids out of the well until no more contaminants are produced. Old river bed channels or other depressions could therefore be inches away from the point the wellbore is placed, and the contaminants laying in the channel could be unrecoverable. DNAPLs generally contaminate ground water by slowly dissolving in the ground water. Attempts to remove DNAPLs by pumping and treating ground water are very slow because of limited solubility of DNAPLs in water. Such sites therefore must be maintained for extended periods of time. Further, it is not always convenient or possible to put wellbores above each suspected low spot.

It is therefore an object of the present invention to provide a method to remove DNAPLs from pools on impermeable layers. It is a further object to provide such a method wherein the contaminates can be removed in a relatively short period of time, and wherein numerous wellbores above pools of DNAPLs are not required.

SUMMARY OF THE INVENTION

This and other objects are accomplished by a method to remove contaminants that are more dense than water from a contaminated volume of earth, the contaminants pooled above a layer of earth, the method comprising the steps of: providing an essentially horizontal wellbore along the interface between the layer of earth and the contaminants; heating at least a portion of the contaminants in situ from the wellbore; and removing the heated contaminants by heating through the horizontal wellbore.

The wellbores preferably include both heaters and provide a conduit for removal of contaminants, and preferably also provide heaters located within the wellbores in addition to those heaters required to vaporize the contaminants to maintain the contaminants in a vapor state until the vapors reach a well head and can be further processed at the surface.

DESCRIPTION OF A PREFERRED EMBODIMENT

Figure 1:
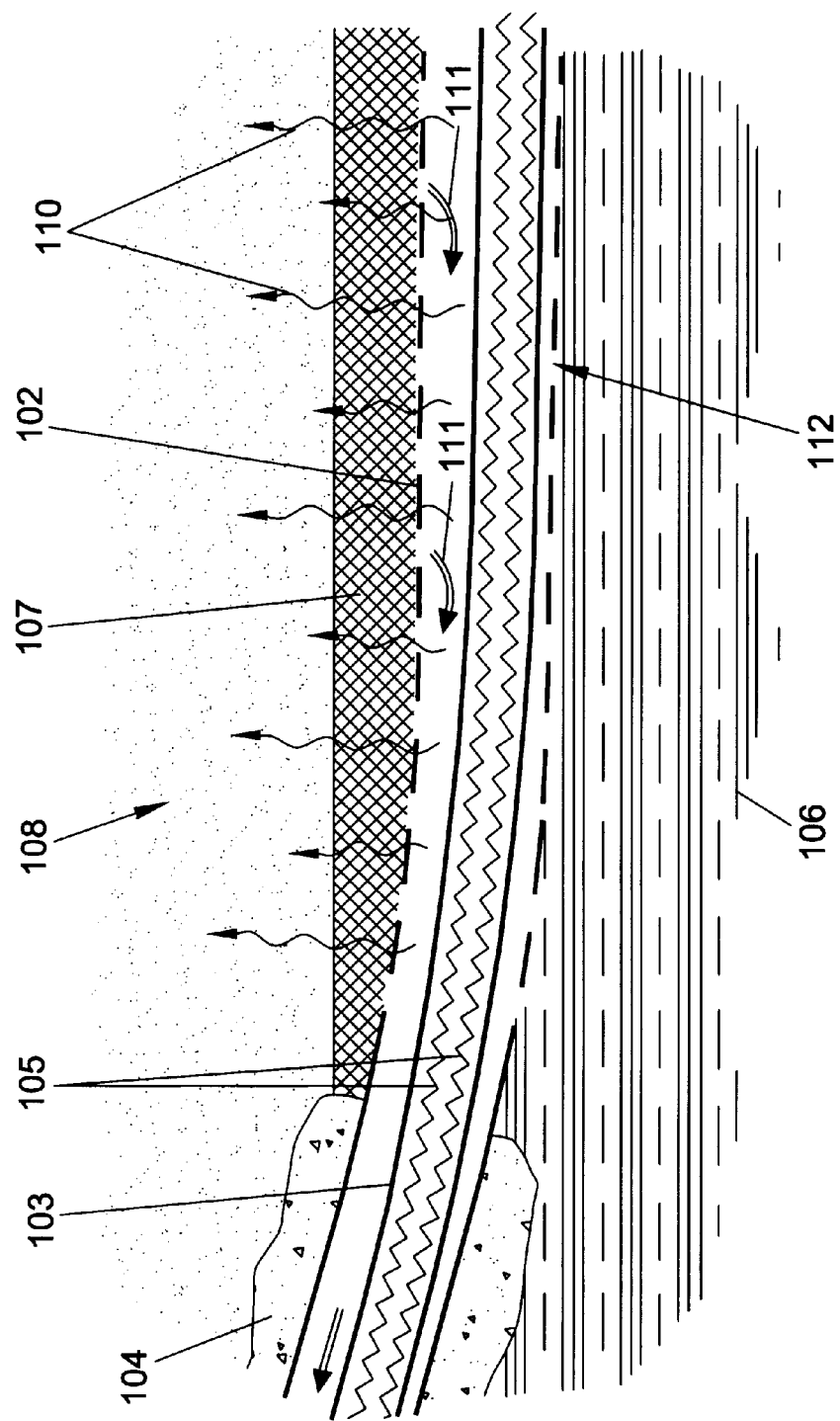
FIG. 1 is a vertical profile of a wellbore according to the present invention.

This invention addresses a problem of contaminants lying along a layer on which DNAPL collects. This may be a soil layer of very low permeability, such as a clay or silty clay, or a permeable layer through which the DNAPL has not penetrated due to insufficient hydraulic head. It has been found that heating these contaminants effectively removes the contaminants economically and within a reasonable time frame.

The present invention is applicable to a wide variety of contaminants. PCBs, mercury, chlorinated solvents, and heavy gas oils, for example, can be removed as liquids or vapors by the present invention. Normal boiling points of these materials are well above temperatures that can be initially achieved in situ. Initially, application of heat results in lowered viscosity of the DNAPL, and therefore increased rate of drainage into the well. At higher temperatures, connate water will vaporize, resulting in steam distillation, removing a further significant amount of DNAPL. After liquid water is vaporized, temperatures will increase more rapidly, resulting in further vaporization of DNAPLs. Vaporization of the DNAPLs results in removal of almost all contaminants even if the DNAPLs are trapped in a pool somewhat below the horizontal wellbore. This eliminates the need to provide a wellbore into every low spot in the interface between the permeable and impermeable layers.

The wellbores of the present invention can be cased and cemented wellbores such as are utilized in the oil industry, but such elaborate wells may not be justified in most applications. Typically wells can be utilize in the present invention that are cased but not cemented. The wellbore may be perforated for collection of vapors according to methods well known in the oil industry.

Heat is imparted to the contaminants by thermal conduction from the wellbore. Wellbore heaters useful for heating the wellbore to provide heat for thermal conduction into the formation are known. Electrical wellbore heaters are disclosed in, for example, U.S. Pat. No. 5,060,287, incorporated herein by reference. For example, gas fired wellbore heaters are taught in U.S. Pat. Nos. 2,902,270, and 3,181,613, incorporated herein by reference. A preferred gas fired wellbore heater is disclosed in, for example, U.S. Pat. No. 5,255,742, incorporated herein by reference.

Heat is applied to the contaminants by conduction, and is preferably applied from a wellbore which also serves as a source of suction to remove contaminant containing vapors from the wellbore. In this preferred embodiment, vaporized contaminants are therefore transported from the formation directly to the wellbore for recovery without the possibility that they are transported to cooler soil where the contaminants could condense, causing an increased concentration of contaminants where condensation occurs.

As heat is applied to the soil, vapor is generated by the heat when the temperature teaches the boiling point of liquids in the region being heated. Generally, liquid water will be present, and the contaminants will be removed by steam distillation as water vaporizes in the soil surrounding the contaminants and passes through the soil to the vapor collection conduits. It is preferred that at least some of the mobile contaminant be removed from the wellbore by pumping prior to heating to a temperature at which vapors are generated in the region near the wellbore. Adding heat lowers the viscosity of the contaminants, and results, at least initially, in increased rates of drainage of the DNAPLs to the wellbore. More preferably, DNAPLs are removed by pumping liquids from wellbore until mostly water is being pumped. One reason for this is that applying heat to the DNAPLs when the DNAPLs saturate the soil in contact with the wellbore may decompose in them to coke. Significant amounts of coke would reduce permeability of the perforations and the soil directly around the wellbore. The presence of an excess of water will supress coke formation on heating.

Electrical resistance heaters are shown, but other heater types could also be provided. Electrical heaters are convenient because they do not require flowlines within the casing, leaving more room for flow of vapors from the contaminated soil.

Additional wellbores equipped to insert heat and/or to remove vapors, referred to as guard wells, are preferably provided in soil surrounding the contaminated zone in order to ensure that contaminants do not move away from the initially contaminated volume. Additional guard wells could also be placed around the contaminated zone to reduce water flow into the heated soil and permit higher temperatures at the location of the contaminants.

Another option to reduce flow of ground water into a contaminated zone that is being heated is to provide a sheet wall, cement, bentonite slurry wall, or other impermeable barrier around the contaminated zone. The impermeable barrier could extend from the surface to at least the top of a relatively impermeable barrier. Typically, the top of the low permable layer on which the DNAPL sits is deep enough for the impermeable barrier.

Stainless steel slotted or perforated liners of about 4 inches diameter are preferred for lining the horizonal boreholes. The wells can be drilled starting from a location about 150 ft away from the edge of the contamination when the contamination is about 30 feet below the surface. For other depths, the distance away is preferably chosen so that the average angle of the well approaching the contamination is between about 15° and about 45°. A nonmagnetic jet source is preferably used for drilling the holes. The nonmagnetic jet source is preferred to avoid interference with a preferred drill steering control that includes a sonde with accelerometer and 3-axis magnetometer within feet of the bit. A gamma ray logging sonde located just behind the drill steering sonde can be used to measure the height above the clay. To do this, first a vertical core is obtained and natural gamma radiation is measured using a core gamma ray logger. Then, based on natural gamma ray intensity of clay relative to sand found from this core, data from the gamma ray sonde can be used to determine the drill bit location above the clay. Lateral steering can be accomplished using a surface magnetic dipole loop source to guide the 3-axis magnetometer located in the drill steering sonde. The strength of the magnetic dipole signal can also be used to indicate the depth of the sonde relative to the surface. Magnetic dipole surface locations are preferably surveyed before drilling commences and the bit can then be guided towards these locations.

Bentonite mud can be used for drilling fluid, contained in a closed loop circulation system. A closed loop system is preferred to contain any contamination that becomes mixed with drilling fluid.

The horizonal wellbores (for example, of about 6 inch diameter) can be cased with, for example, K55 steel and cemented with class G cement in the section from the surface down to the horizontal section. The horizontal section can be, for example, a 4" nominal (4 ½" OD) 304 stainless steel schedule 10 slotted pipe (0.120" wall–4.26" ID). Each 20 ft joint within the horizontal section can be, for example, fully slotted with 0.032" wide by 2" long vertical slots 15 rows around the pipe. There are therefore preferably 60 slots per foot, resulting in 3.84 square inches of open area per linear foot of well. Natural pack development should be, in most cases, sufficient for the well completion in a sandy soil.

Heaters can be contained in 2⅞ inch 304 stainless steel schedule 10 heating pipe sealed at the far end of the horizontal section. The heating element inside the heating pipe consists of 3 mm nichrome wire strung in interlocking steatite insulating beads (available, for example, from Cooperheat Inc., Houston, Tex.). Periodically the beads, can be threaded to a stainless steel strip for conveying the heating element into the pipe. Type K "INCONEL" sheathed thermocouples can be located periodically in holes in the steatite beads for temperature sensing and control. The heating pipe can maintain a temperature at the surface of the pipe of up to 1600° F. if required for heating the slotted liner. The heating pipe is movable and heating elements can be replaced in the heating pipe while still in the well.

Referring now to FIG. 1, a vertical cross section of a horizontal wellbore suitable for practice of the present invention is shown. A horizontal wellbore is cased, in a horizontal section 102 with a perforated casing and in a section leading to the horizontal section with a nonperforated casing. The nonperforated casing is cemented with cement 104 to prevent migration of liquids along the wellbore. A heat tube 103 is within the casing. The heat tube contains heat elements 105 which generate heat by electrical resistance. The horizontal section is placed at an interface between an impermeable clay layer 106 and a pool of DNAPL contaminants 107. The pool of contaminants saturates a lower portion of a permeable sediment 108 above the clay layer. Heat 110 generated by the heating elements is transferred out of the casing and vapors 111 generated within the soil flow into the casing though perforations 112.

Figure 2:
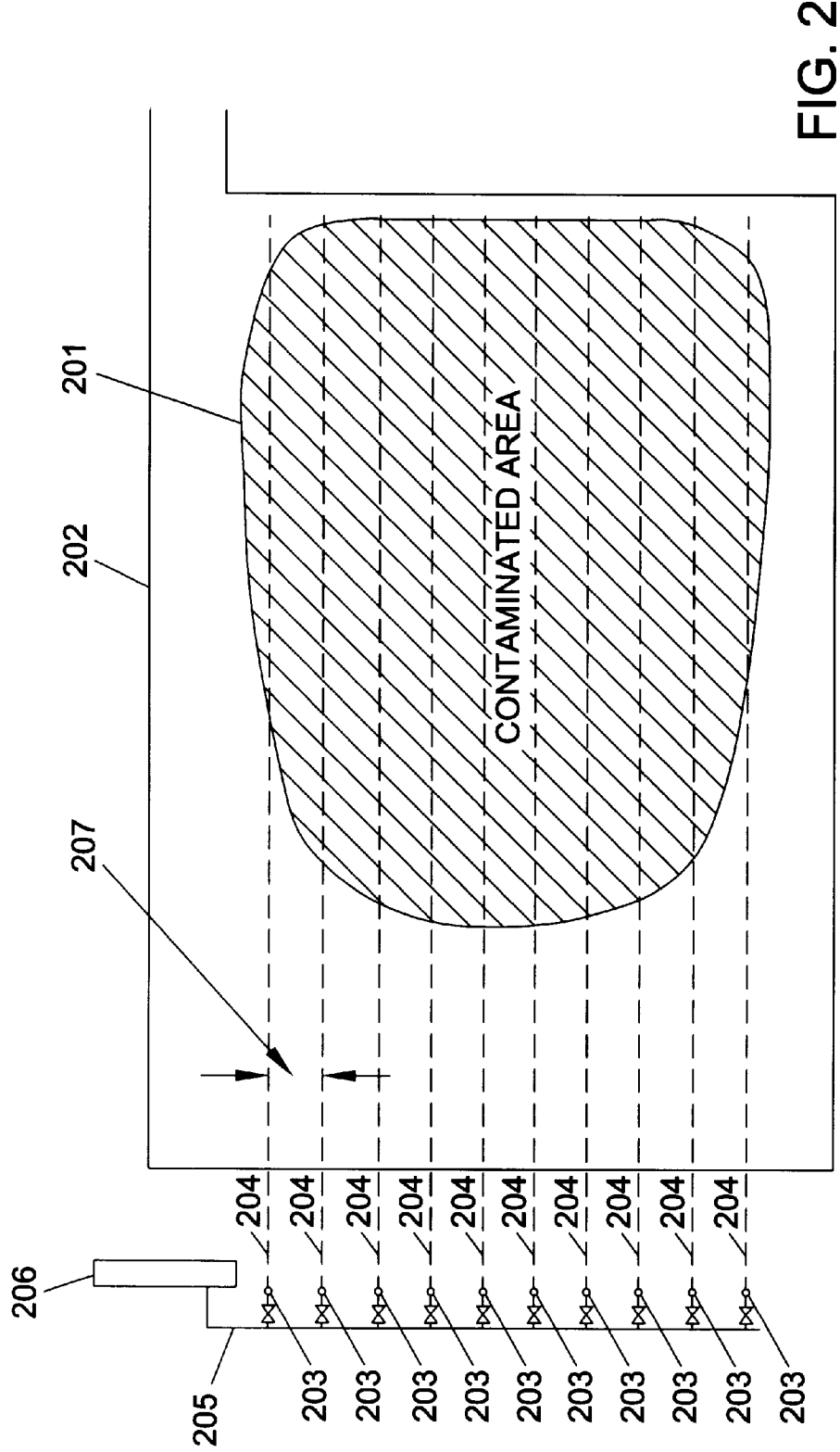
FIG. 2 is a plan view of a series of parallel essentially horizontal wellbores according to the present invention.

Referring now to FIG. 2, a plan view of an exemplary application of the present invention is shown. An area of contamination 201 is trapped on top of an impermeable layer of clay, and is located below a parking lot 202. A significant advantage of using horizontal wellbores is that the well heads may be located with considerable more flexibility than vertical wellbores. In the example shown in FIG. 2, for example, the contaminated region is located underneath a parking lot. With vertical wellbores, the wellheads would have to be located nearly above the contaminated region, or within the parking lot shown. With horizontal wellbores, wellheads 203 can be located remotely, and considerable more flexibility exists as to in which direction from the contamination the wellbores can be placed. The distance between the contaminated region and the wellbores generally must be above a minimum required distance (which varies with the depth of the contamination) but at an expense, can be located farther away from the contamination. Economics can dictate how far above the minimum distance the wellheads are located to the contamination. Horizontal wellbores 204 are shown extending from the wellheads toward the contaminated region. A manifold 205 collects vapors at the wellheads and provides a conduit to route the vapors to a treatment facility 206. Distance 207 between parallel horizontal wellbores can be, for example, between about 3 and about 20 feet. This distance is preferably less than about 10 feet because heat loss to above and below the contamination from the heater becomes excessive if the distance between the wellbore and a location which must be heated from the wellbore becomes too great. How close the weibores are to each other is limited only by a tradeoff between cost of providing the wellbores and wellheads and factors such as the time required to remediate and the total energy cost.

The contaminated volume is shown as underneath an overburden, but if the soil is to be heated to the surface, insulation can be provided above at the surface. Further, if the contaminated volume extends to near the surface, it could be beneficial to provide a vapor seal over the surface to prevent excessive amounts of air from being pulled into the contaminated volume.

Vapors are removed through the horizontal wellbores, and these vapors can then be treated to remove contaminants by methods known in the art. For example, thermal oxidizers can be provided to oxidize the contaminants, and then the remaining vapor stream could be passed through carbon beds to collect residual contaminants and/or the oxidation products of the contaminants. A blower will generally be provided to maintain a low absolute pressure within the wellbore. Lower pressures are beneficial because lower pressures decrease the temperatures at which water and contaminants are vaporized.

EXAMPLE

Three alternatives for processes to remove PCBs (exemplary of DNAPLs) from under a water table and lying on a clay layer were evaluated by a numerical simulation using a heat and mass transfer model. The first two alternatives are examples of conventional prior art. The third option is exemplary of a preferred embodiment of present invention. The values used in the simulation are based on an existing contaminated site. The pool of PCBs are 100 feet by 200 feet, and at the deepest point, three feet deep. Pressure-temperature-density relationships of the PCB's at this site were based on data from EPA publications. The model includes a vadose zone, a saturated zone, a free-flowing PCB zone and bounding clay layers underneath. Horizontal wells are placed on top of a bounding clay at the base of the PCB pool, along the length of the pool. The set of 10 wells across 100' of PCB pool give rise to a repetitive pattern 10' wide. The horizontal wells can be drilled and completed in about 30 days for an estimated total cost of about $350,000. The access to the area directly above the contamination will be unrestricted during both during and remediation.

Conditions for the simulations are as follows:

Vadose Zone:
  Thickness=13 feet
  Porosity=30%
  Hydraulic conductivity=2.4 feet/day
  Permeability=0.9 Darcy
  Hydraulic gradient=0.012
  Initial Water saturation=30%
  Initial Air saturation=69.8%
  Initial PCB saturation=0.1%
  Irreducible Water Sat,=30%
  Thermal Conductivity
    Dry=$2.4\times10^{-3}$ cal/sec/cm/° C.
    Wet=$3.0\times10^{-3}$ cal/sec/cm/° C.

Saturated Zone:
  Thickness=12.7 feet
  Porosity=30.%
  Hydraulic conductivity=2.4 feet/day
  Permeability=0.9 Darcy
  Hydraulic gradient=0.012
  Initial Water saturation=94.7%
  Initial Air saturation=5%
  Initial PCB saturation=13%
  Irreducible Water saturation=30%
  Thermal Conductivity
    Dry=$2.4\times10^{-3}$ cal/sec/cm/° C.
    Wet=$3.0\times10^{-3}$ cal/sec/cm/° C.

Free flowing PCB Zone:
  Thickness=2.5 feet
  Porosity=30%
  Hydraulic conductivity=10 feet/day
  Permeability=3.7 Darcy
  Hydraulic gradient=0.012
  Initial Water saturation=20%
  Initial Air saturation=0.1%
  Initial PCB saturation=79.9%
  Irreducible Water saturation=30%
  Irreducible PCB saturation=25%
  Thermal Conductivity
    Dry=$2.4\times10^{-3}$ cal/sec/cm/° C.
    Wet=$3.0\times10^{-3}$ cal/sec/cm/° C.

Option 1

This option involves the use of two 6" OD wells. One well is 200' long and located along the small reservoir dip while the second well is nearly perpendicular to the first and located along the east end of the pool of contaminamts. The contaminants drain into the two wells by gravity drainage and are pumped to the surface for off-site disposal.

Option 2

For this option, a set of ten horizontal wells are used across the 100' (approximately) width of the pool and completed as per the description above of the preferred embodiment. In this example, the proximity of the wells (10' well distance) is used to accelerate production together with a bottom hole pressure of 16 psia which allows for approximately 11 psi across the perforations. The time to achieve residual saturation for this option becomes two to three years. The produced fluids including PCBs and water are collected at the surface and disposed off-site.

Option 3

This alternative again utilizes the 10 horizontal well array; each equipped with a heater in the horizontal section and another heater in the vertical section to prevent condensation of PCB in the vertical section. Produced PCB's are mostly destroyed in situ. The remaining PCBs are kept in the gas phase though up-hole heaters until the produced gases reach a thermal oxidizer on a process trailer at the surface where they are fully destroyed.

RESULTS

In option 3, the example of the preferred embodiment, substantial desaturation of the PCBs is obtained early on due to three effects: the flush production from a suction well operating at 16 psi bottom hole pressure; the rapid flush distillation of PCBs by the water present (30% initial saturation); and the rapid boil-off of PCBs driving all fluids into a very mobile gas phase. As the thermal fronts expand outward these last two effects account for the bulk of the production. Once water is gone, the boiling of PCBs into the gas phase is the main production mechanism which is entirely driven by the rate of heat infectivity into dry soil. Very low residual levels (about 2 ppm) of PCBs are achieved in about 240 days. Anisotropy and other soil imperfections, such as muffin-tin depressions, will result in options 1 and 2 being substantially less effective than the modeling results predict. These imperfections have less effect on option 3 because heat transfer is much less sensitive to soil variability, and the high gas phase mobility circumvents permeability heterogeneity.

Option 3, which involves heating the contaminated soil with an array of ten horizontal wells, also represents the most cost effective way of treating that site.

The table below shows the duration and costs (in millions of US dollars) for the three options described above, along with the present value of the costs (discounted at 5%).

TABLE 1

| OPTION | DURATION YEARS | CAPITAL COST PV $\times 10^{-6}$ | O&M[1] COST PV $\times 10^{-6}$ | TOTAL COST PV $\times 10^{-6}$ | TOTAL COST $\times 10^{-2}$ | PCBs AT END[2] |
|---|---|---|---|---|---|---|
| 1 | 100 | 0.3 | 1.5 | 1.8 | 8. | 6.62% wt |
| 2 | 2 | 0.9 | 1.7 | 2.6 | 2.7 | 5.51% wt |
| 3 | 1 | 0.9 | 0.7 | 1.6 | 1.6 | 0.0002% wt |

[1]Operating and maintenance costs- present value.
[2]PCBs remaining after the DURATION of the remediation.

From the Table it can be seen that Option 3 (the present invention) results in significant savings in costs and also the time required for remediation. Further, remediation is more complete by a dramatic amount. Because Options 1 and 2 rely on drainage, they rely on a smooth interface between the permeable and impermeable surfaces. Because these surfaces are generally not smooth, the estimated recoveries for Options 1 and 2 would not actually be achieved. Because Option 3 heats the entire surface to the boiling point of the PCB, liquid phase drainage to the well is not necessary, and the level of remaining PCBs estimated by the simulation is achievable, even with trapped pools of PCBs on the surface of the clay. Thus, remediation is considerably more reliable and complete, with pockets of contaminants not remaining in low spots between wellbores, using the present invention.

We claim:

1. A method to remove contaminants that are more dense than water from a contaminated volume of earth, the contaminants pooled above a layer of earth on which the contaminants collect forming an interface between the layer and the contaminants, the method comprising the steps of:
    providing an essentially horizontal wellbore along the interface between the layer of earth and the contaminants;
    heating at least a portion of the contaminants in situ from the wellbore; and
    removing the heated contaminants by heating through the horizontal wellbore.

2. The method of claim 1 wherein the heating is accomplished by heating from within the horizontal wellbore.

3. The method of claim 1 wherein a plurality of essentially parallel horizontal wellbores are provided along the interface between the layer of earth and the contaminants.

4. The method of claim 3 wherein the essentially horizontal wellbores each provide heat to the formation and serve as conduits to collect vaporized contaminants.

5. The method of claim 3 wherein alternating essentially horizontal wellbores provide heat to the formation and serve as conduits to collect vaporized contaminants.

6. The method of claim 1 further comprising the step of removing at least some contaminants in a liquid phase prior to vaporizing the contaminants.

7. The method of claim 1 wherein contaminants are maintained in a vapor phase by supplemental heaters in the essentially horizontal wellbore.

8. The method of claim 1 wherein the contaminants have low solubility in water.

9. The method of claim 1 wherein the heating is accomplished at least in part by electrical heaters within the horizontal wellbore.

10. The method of claim 1 wherein the layer of earth is selected from the group consisting of a clay layer and a silty clay layer.

11. The method of claim 1 wherein at least a portion of the contaminants are removed as vapors.

* * * * *